US 12,523,344 B2

(12) United States Patent
Horn et al.

(10) Patent No.: US 12,523,344 B2
(45) Date of Patent: Jan. 13, 2026

(54) RELEASE VALVE

(71) Applicant: LEAFIELD MARINE LIMITED, Melksham (GB)

(72) Inventors: Stephen Horn, Melksham (GB); Wayne Young, Melksham (GB); Steven Sobek, Melksham (GB); David Dickins, Melksham (GB); Nicholas Lockett, Melksham (GB); Jeff Vickers, Melksham (GB)

(73) Assignee: LEAFIELD MARINE LIMITED, Melksham hire (GB)

( * ) Notice: Subject to any disclaimer, the term of this patent is extended or adjusted under 35 U.S.C. 154(b) by 439 days.

(21) Appl. No.: 18/076,517

(22) Filed: Dec. 7, 2022

(65) Prior Publication Data

US 2023/0175651 A1    Jun. 8, 2023

(30) Foreign Application Priority Data

Dec. 8, 2021 (GB) ........................... 2117730

(51) Int. Cl.
*F17C 13/04*     (2006.01)
*F16K 17/40*     (2006.01)
(Continued)

(52) U.S. Cl.
CPC .............. *F17C 13/04* (2013.01); *F16K 13/04* (2013.01); *F16K 31/56* (2013.01); *F16K 31/60* (2013.01);
(Continued)

(58) Field of Classification Search
CPC ................ F17C 13/04; F17C 2205/032; F17C 2205/0329; F17C 2205/0382;
(Continued)

(56) References Cited

U.S. PATENT DOCUMENTS 2,120,248 A * 6/1938 Hinchman .............. F16K 13/04
                                                          251/74
4,520,838 A    6/1985 Fisher et al.
(Continued)

FOREIGN PATENT DOCUMENTS

DE        20216608 U1    3/2004
GB         2291172 A     1/1996

OTHER PUBLICATIONS

Combined Search and Examination Report for GB2117730.8; Sep. 20, 2022; 11 pgs.
European Search Report dated May 25, 2023 for EP 22212257.4-1015.

*Primary Examiner* — Jeremy Carroll
(74) *Attorney, Agent, or Firm* — Perilla Knox & Hildebrandt LLP

(57) ABSTRACT

There is provided a release valve for releasing fluid from a source of compressed fluid for inflating an inflatable structure, comprising: a housing comprising an inlet for coupling to a source of compressed fluid, and an outlet; a flow chamber disposed within the housing and forming part of a flow path from the inlet to the outlet; a valve member configured to move to a release position to permit fluid to flow from the inlet to the flow chamber; and an actuator and a biasing device, wherein the actuator and the biasing device are disposed in the flow chamber, the actuator configured to move through the flow chamber from an unactuated position to an actuated position to move the valve member to the release position.

15 Claims, 3 Drawing Sheets

(51) Int. Cl.
*F16K 31/56* (2006.01)
*F16K 31/60* (2006.01)

(52) U.S. Cl.
CPC .... *F16K 2200/30* (2021.08); *F17C 2205/032* (2013.01); *F17C 2205/0329* (2013.01); *F17C 2205/0382* (2013.01); *F17C 2205/0394* (2013.01)

(58) Field of Classification Search
CPC ............. F17C 2205/0394; F16K 13/04; F16K 31/56; F16K 31/60; F16K 2200/30
See application file for complete search history.

(56) References Cited

U.S. PATENT DOCUMENTS

| | | | | |
|---|---|---|---|---|
| 4,805,802 | A * | 2/1989 | MacKendrick | F17C 7/00 222/5 |
| 4,959,034 | A * | 9/1990 | Wass | B63C 9/24 441/41 |
| 6,260,570 | B1 * | 7/2001 | Wass | F16K 31/56 441/41 |
| 6,260,571 | B1 | 7/2001 | Wass | |
| 6,837,245 | B2 * | 1/2005 | Matheny | A62B 7/02 128/205.24 |
| 7,011,232 | B2 * | 3/2006 | Colombo | B60R 21/274 222/5 |
| 11,274,754 | B2 * | 3/2022 | Czechowski | F17C 13/04 |
| 2020/0096123 | A1 * | 3/2020 | Czechowski | F16K 13/04 |
| 2020/0191285 | A1 * | 6/2020 | Czechowski | F17C 13/04 |

* cited by examiner

RELEASE VALVE

CROSS-REFERENCE TO RELATED APPLICATION

This application claims the benefit of GB 2117730.8 filed Dec. 8, 2021, the entirety of which is hereby incorporated herein by reference for all purposes.

FIELD OF INVENTION

The present disclosure relates to a release valve for releasing fluid from a fluid source, and a storage container for a fluid under pressure provided with a release valve.

BACKGROUND

Inflatable life rafts and similar articles are filled for use from a fluid container, such as a gas bottle or cylinder, which contains the inflation gas. A common inflation gas is carbon dioxide, stored in the container at a pressure high enough to liquefy the gas at normal temperatures. It is also common to include in the cylinder or bottle a propellant gas, such as nitrogen, to speed up the flow of carbon dioxide to the inflatable life raft. Consequently, the cylinders or bottles commonly contain liquefied carbon dioxide, having a free surface above which there is a pocket of nitrogen.

Such release valves need to be capable of withstanding the pressure applied by the contents of the container, without leakage, for long periods of time, and yet work reliably to release the gas when required. These release valves are typically actuated by means of a lanyard or ripcord.

Many known release valves, for example that shown in GB2291172, employ a diaphragm to prevent flow until inflation is required. Pulling of the lanyard actuates a mechanism which punctures the diaphragm to allow the contents of the container to flow to the inflatable article. These known release valves are typically arranged such that the mechanism used to actuate the valve and puncture the diaphragm is housed separately to the portion of the release valve through which fluid flows from an inlet to an outlet. These release valves can be stored on the inflatable article and can occupy a significant amount of space within and add weight to the inflatable article, which is undesirable.

There is therefore a need to develop a release valve which addresses at least the aforementioned issues.

SUMMARY

According to a first aspect there is provided a release valve for releasing fluid from a fluid source, comprising: a housing comprising an inlet for coupling to a fluid source, and an outlet; a flow chamber disposed within the housing and forming part of a flow path from the inlet to the outlet; a valve member configured to move to a release position to permit fluid to flow from the inlet to the flow chamber; and an actuator and a biasing device, wherein the actuator and the biasing device are disposed in the flow chamber, the actuator configured to move through the flow chamber from an unactuated position to an actuated position to move the valve member to the release position.

The release valve may be for releasing fluid from a source of compressed fluid for inflating an inflatable structure. The inlet of the housing may be for coupling to a source of compressed fluid.

The biasing device may be configured to drive the actuator to the actuated position.

The biasing device may comprise a spring acting on the actuator via a projection extending from the actuator to bias the actuator to the actuated position. The projection may comprise one or more flow holes to permit fluid to flow therethrough to the outlet in at least the actuated position of the actuator.

The projection may comprise a plate secured to an external surface of the actuator. The projection may be integrally formed with the actuator.

The actuator may comprise a vent to permit fluid to flow therethrough to the outlet in at least the actuated position of the actuator.

A release valve may further comprise an activation mechanism configured to be operated by a user to cause the actuator to move from the unactuated position to the actuated position.

The activation mechanism may comprise a handle configured to be pulled by the user and a retaining member configured to retain the actuator in the unactuated position, wherein the retaining member is configured to move to allow the actuator to move to the actuated position when the handle is pulled by the user.

In the unactuated position, the retaining member may bear against the actuator and a protrusion within the housing to retain the actuator in the unactuated position. When the handle is pulled by the user, the retaining member may be configured to move and be retained within a groove within the actuator.

The valve member may comprise a frangible disc sealingly closing the inlet to the flow chamber in the unactuated position.

The actuator may further comprise a cutter configured to break the disc in the release position to allow fluid to flow from the inlet. The cutter may be integrally formed with the actuator.

The housing may be formed in two parts comprising an actuation body which houses the actuator and the biasing device, and a valve body which is configured to couple to the source of fluid, in particular the source of compressed fluid. The actuation body may be releasably coupled to the valve body to define the housing therebetween.

The inlet may be formed in the valve body and the outlet may be formed in the actuation body.

The release valve may have a longitudinal axis corresponding to a path of movement of the actuator. The outlet may be formed as an outlet port extending outward from the actuation body along a direction having a radial component with respect to the longitudinal axis.

The outlet may be one of two outlets, each formed as an outlet port extending outward from the actuation body along a direction having a radial component. The two outlet ports may each define a respective coupling axis for connecting to a respective fluid line. The coupling axes may be substantially parallel with one another.

The two outlet ports may be offset with respect to each other such that the respective coupling axes are offset along the longitudinal axis and/or a lateral direction normal to each of the longitudinal axis and the coupling axes.

According to a second aspect, there is provided a storage container for a fluid under pressure provided with a release valve in accordance with the first aspect as described above.

BRIEF DESCRIPTION OF THE DRAWINGS

Exemplary embodiments will now be described, by way of example only, with reference to the following drawings, in which.

DETAILED DESCRIPTION OF THE INVENTION

Figure 1:
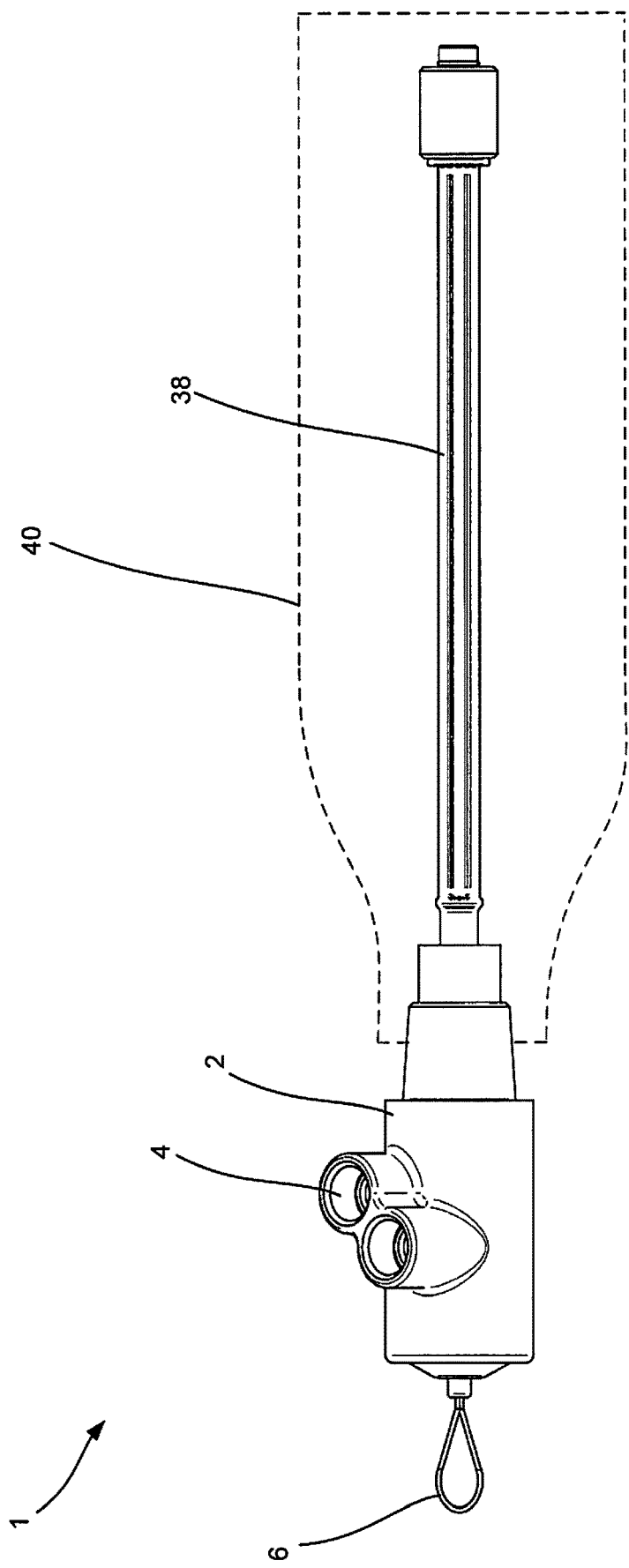
FIG. 1 is a side view of an example release valve according to the present disclosure.

FIG. 1 shows an example release valve 1 according to the present disclosure. The release valve 1 comprises a housing 2. The housing 2 includes one or more outlet ports 4 extending radially outwards from the external surface of the housing 2. In this example, the release valve 1 has two outlet ports 4. In other examples, the release valve 1 may have more or fewer outlet ports. The release valve 1 also comprises a handle 6 as part of a mechanism for actuating the release valve 1.

The release valve 1 can be connected to a storage container 40, for example a gas bottle or cylinder, which contains a fluid under pressure. The fluid may include carbon dioxide and/or nitrogen. The outlet ports 4 of the release valve 1 can be connected to an inlet valve of a life raft or other article, for example via a hose connection.

Figure 2:
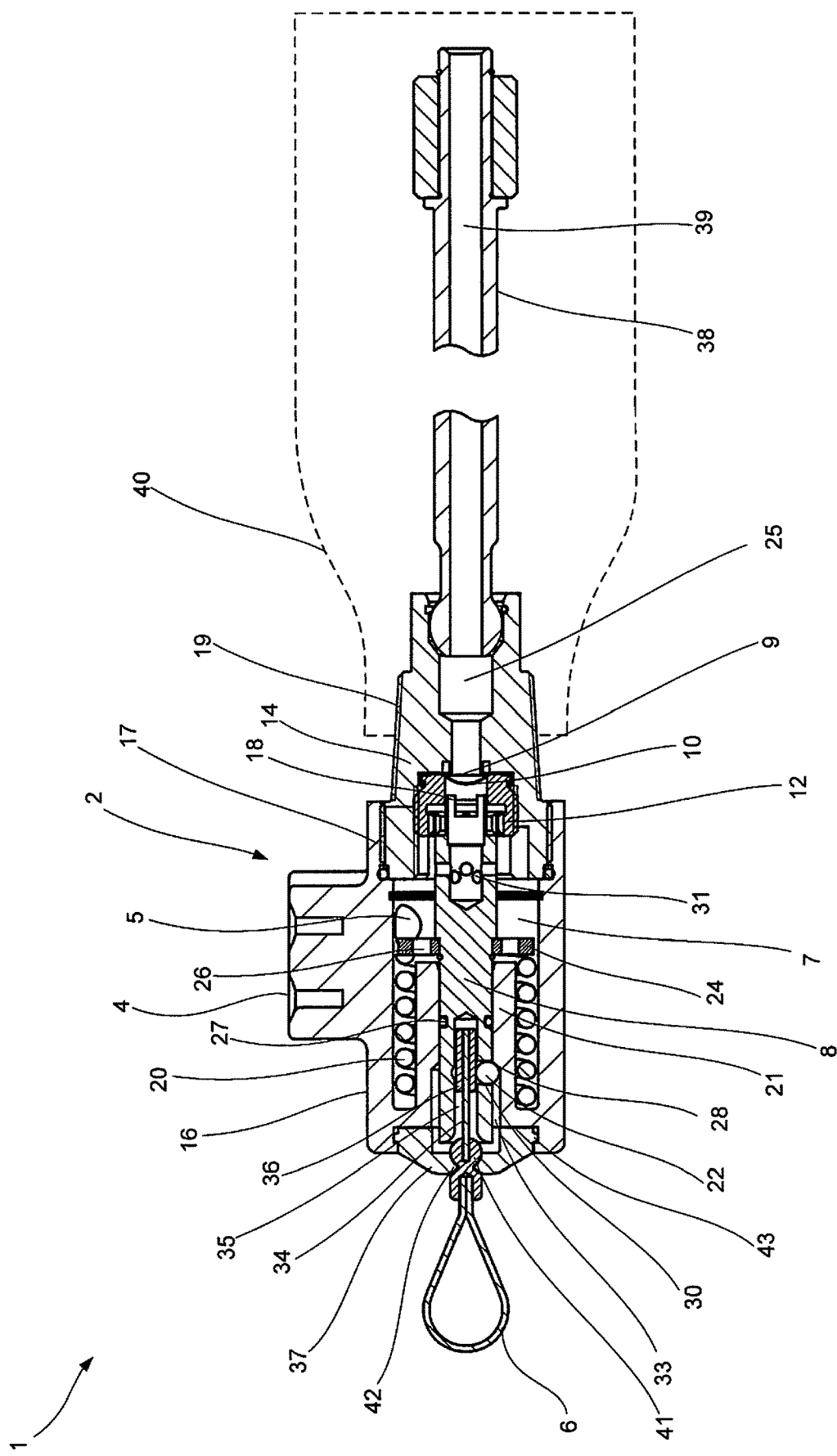
FIG. 2 is a cross-section view of the release valve of FIG. 1 when in an unactuated condition.

FIG. 2 shows a cross-section of the release valve 1 of FIG. 1 in a non-actuated condition, when fluid from the container has not been released into the release valve 1. The housing 2 defines a chamber 7 through which fluid can flow through. The housing 2 is formed in two parts, comprising a valve body 14 and an actuation body 16. The valve body 14 is releasably attached to the actuation body 16. The valve body 14 comprises a threaded portion 17 for screwing into a complementary threaded portion on the actuation body. In other examples, any suitable means may be provided to releasably attach the valve body 14 to the actuation body 16, for example via a bolted or clamped connection. In other examples it may be fixedly attached (i.e. not releasable), for example by a welded connection. The outlet ports 4 are located on the actuation body 16.

The valve body 14 is configured to connect to the container 40 via a threaded connection 19. The release valve further comprises a pick up tube 38. The pick up tube 38 extends into the container 40. The pick up tube 38 comprises a thin-walled tube. The tube 38 may be flexible or rigid. The tube 38 forms an inlet passageway 39, through which fluid from the container 40 enters the release valve 1. The inlet passageway 39 is fluidly connected to an inlet duct 25 of the valve body 14. The inlet duct 25 terminates at the inlet 9. The inlet 9 represents the starting point of a flow path of the release valve that fluid flows along when the release valve 1 is actuated.

The inlet 9 may be sealed by a burst disc 10 as shown in FIG. 2. The burst disc 10 is configured to prevent fluid from entering the flow chamber 7 of the housing 2 until the release valve is actuated. In this example, the burst disc 10 is held in place within the valve body 14 by a screwed ring 12. The burst disc 10 may be a frangible or breakable disc. The disc 10 may be formed from a metallic material or may be formed from a polymeric material. When the release valve 1 is assembled, the burst disc 10 is fitted to the screwed ring 12, and the screwed ring 12 is inserted and screwed into the valve body 14.

The release valve 1 further comprises an actuator 8 located within the flow chamber 7 of the housing 2. The actuator 8 is configured to move through the flow chamber 7 when the release valve 1 is actuated. In particular, the actuator 8 is configured to move linearly along the axial direction of the release valve 1, and thereby defines a longitudinal axis of the release valve. In the example shown, the actuator 8 extends along the length of the actuation body 16 and into the valve body 14. The actuation body 16 comprises an annular projection 21 extending into the chamber 7 from a distal end of the actuation body 16 relative to the inlet 9. The actuator 8 is disposed within the internal bore of the annular projection 21 and is configured to slidably move within the internal bore, such that the internal bore of the annular projection 21 defines the longitudinal axis of the release valve, coincident with the path of movement of the actuator 8 in use. An O-ring seal 27 is located between the actuator 8 and the internal bore of the annular projection 21 to prevent fluid from passing around the side of the actuator 8 and into the internal bore.

A cutter 18 is formed at an end of the actuator 8 closest to the valve body 14. In this example, the cutter 18 is formed integrally with the actuator 8. In other examples, the cutter 18 may be formed as a separate component and subsequently mounted to the end of the actuator 8. The cutter 18 is formed as a hollow cylinder and the end of the cutter 18 closest to the inlet 9 has a cutting edge. The cutting edge is circular, having a gap around its circumference. As the actuator 8 moves within the flow chamber 7, the cutter 18 moves within a space formed by a cylindrical bore of the screwed ring 12.

The actuator 8 has a plurality of bores 31 extending radially therethrough in communication with the hollow part of the cutter 18. When the release valve 1 is actuated, fluid flows from the inlet 9, through the hollow part of the cutter 18 and out of the actuator 8 via the bores 31 into the flow chamber 7. The bores 31 therefore function as a vent for fluid to flow out of the actuator 8 and into the flow chamber. In other examples there may be an alternative flow path not requiring bores 31 as shown in the drawings.

Figure 3:
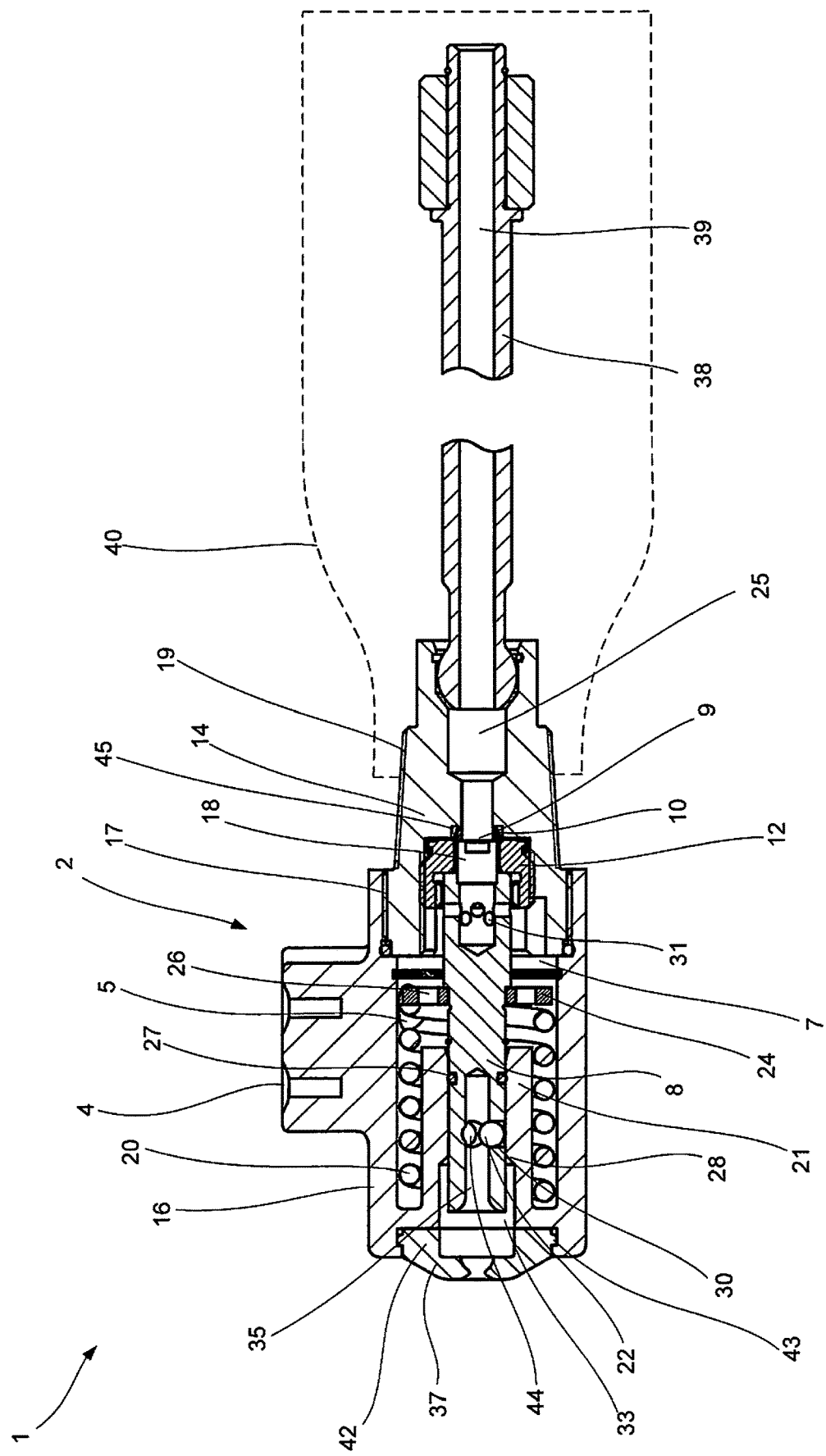
FIG. 3 is a cross-section view of the release valve of FIG. 1 when in an actuated condition.

The release valve 1 further comprises a biasing device. In this example, the biasing device is configured to drive the actuator 8 from the unactuated position (as shown in FIG. 2) to the actuated position (as shown in FIG. 3). In this example, the biasing device is a spring 20. The actuator 8 is biased to move towards the inlet 9 by action of the spring 20. The spring 20 is arranged around the external surface of the annular projection 21. The spring 20 may be a coiled compression spring. In other examples, the biasing device may be configured to drive the actuator to the unactuated position, or to retract the actuator away from the actuated position and towards the unactuated position. In such examples, the actuator may be driven towards the actuated position by a separate motive device.

The release valve 1 further comprises a plate 24. The plate 24 is arranged around the circumference of the actuator 8, such that it forms a projection or a flange for the actuator 8. The plate 24 may be formed in an annular shape. One axial face of the plate 24 buts against a shoulder of the actuator 8 and is retained in place by a clip on the actuator 8 at the opposing axial face of the plate. In other examples, the plate may be integrally formed with the actuator. The spring 20 bears against the plate 24 to provide the biasing force acting on the actuator 8. In the unactuated condition shown in FIG. 2, the spring 20 is therefore compressed between the distal end of the actuation body 16 and the plate 24.

The plate 24 has one or more flow holes 26 extending axially therethrough. The flow holes 26 allow fluid to pass through the plate 24 when the release valve 1 has been actuated. The fluid is configured to exit the chamber 7 through at least one opening 5 in the actuation body 16. Each opening 5 leads to a respective outlet port 4. The outlet ports 4 therefore represent the end point of the flow path that fluid flows along through the release valve 1 when it is actuated.

The release valve 1 further comprises an activation mechanism which is configured to cause the release valve 1 to be actuated, and which is for operation by a user to actuate the release valve. Although other forms of an activation mechanism are possible, in this example the activation mechanism comprises the handle 6 and a retaining member 22. The handle 6 forms part of a cord 34 which extends into the actuation body 16. The handle 6 is attached to one end of the cord 34. The handle 6 is configured to be pulled by a user to actuate the release valve 1. A slider 36 is attached to the opposite end of the cord 34. The slider 36 is configured to slidably move within an axially extending bore 35 formed in the actuator 8. The actuator 8 has a gap 30 extending between the bore 35 and a compartment 33 formed by a space at the end of the internal bore of the annular projection 21. In the un-actuated condition as shown in FIG. 2, the retaining member 22 (which in this example is provided in the form of a ball of the type used in a ball bearing) is located within the gap 30 of the actuator 8. The inner bore of the annular projection 21 includes a shoulder 28 adjacent to the gap 30 of the actuator. Due to the presence of the slider 36 within the bore 35, the retaining member is prevented from entering the bore 35, and therefore the retaining member 22 protrudes slightly out of the gap 30 and bears against the shoulder 28. The biasing force applied by the spring 20 causes the retaining member 22 to be held between the actuator 8 and the shoulder 28. Due to the presence of the retaining member 22 in this position, the actuator 8 is held in place in the unactuated position despite the biasing force applied by the spring 20. In other examples, there may be a plurality of retaining members 22, each retained within a respective gap 30 of the actuator.

The actuation body 16 further comprises a cap 37 at its distal end relative to the valve body 14. The cap 37 has an aperture 42 from which the handle 6 extends from the actuation body 16. The handle 6 is connected to the cord 34 by means of a connecting member 41. In the unactuated condition shown in FIG. 2, the connecting member 41 is located within the aperture 42 of the cap 37. The connecting member 41 has a portion located within the release valve 1 which is wider than the aperture 42.

The cap 37 is releasably mounted to the actuation body 16. In this example, the cap 37 comprises a rib 43 which is retained within a lip of the actuation body 16. The release valve 1 can be reset after it has been actuated by detaching the actuation body 16 from the valve body 14 to access the actuator 8. The actuator can be reset to its unactuated position by removing the cap 37 from the actuation body 16 and pushing the slider 36, cord 34 and connecting member 41 through the aperture 42 of the cap 37. The cap 37 can be subsequently re-mounted to the actuation body 16. Alternatively, the actuator 8 can be reset to its unactuated position with the cap 37 mounted in place on the actuation body, and by pushing the slider 36, cord 34 and connecting member 41 through the aperture 42 of the cap. By being able to reset the actuator 8, the release valve 1 can be reused multiple times, with only the burst disc 10 needing to be replaced after each use.

FIG. 3 shows the actuated condition of the release valve 1, in which fluid is permitted to flow from the inlet 9 to the outlet ports 4. To actuate the release valve 1, a user pulls on the handle 6 with sufficient force to pull the connecting member 41, cord 34 and slider 36 out from the bore 35. When the slider 36 is removed from the bore 35, the retaining member 22 is able to enter the bore 35 and is retained within a groove 44 within the bore 35. The retaining member 22 therefore no longer protrudes out of the gap 30 of the actuator 8 and no longer abuts against the shoulder 28 of the annular projection 21. At this point, there is no longer resistance to the biasing force provided by the spring and therefore the spring 20 forces the actuator 8 to move axially towards the inlet 9.

The cutter 18 moves with the actuator 8 towards the inlet 9 and the cutting edge strikes the burst disc 10. The cutting edge is sufficiently sharp to cut through and puncture the burst disc 10 to release the fluid within the container 40. When broken, the burst disc 10 allows fluid to flow through the inlet 9. The bores 31 of the actuator 8 are sized to prevent any part of the burst disc 10 being forced into the flow chamber 7 as the fluid flows from the inlet.

When the burst disc 10 has been broken, fluid passes through the inlet 9 and through the cutter 18. Fluid subsequently passes through the bores 31 of the actuator to enter the actuation body 16. Fluid can then pass through the openings 5 in the actuation body 16 and exit the release valve 1 via the outlet ports 4. The flow holes 26 of the plate 24 ensure that fluid can pass through outlet openings 5 which are downstream of the plate 24 when the actuator 8 is in the actuated position.

The outlet ports 4 can be connected to a life raft or similar article prior to activation of the release valve 1, such that the life raft or other article can be inflated as the release valve 1 is actuated.

The release valve of the present disclosure provides advantages over known release valves in that it has a more compact structure. It also provides reduced complexity over known release valves by having a reduced number of components.

By housing the actuator and the biasing device within the flow chamber and enabling the actuator to move through the flow chamber, the overall length of the release valve can be reduced as this removes the need for separate housings to contain the actuator, the biasing device, and the flow chamber. The overall length is also reduced by combining the functions of housing the biasing device and providing a flow chamber which serves as a flow path to the outlets, which in turn allows the outlet ports to be positioned on the actuation body towards the location of the biasing device, rather than away from the biasing device, on the valve body. The projection or plate located on the actuator having one or more flow holes enables the actuator to be biased under action of the spring whilst allowing fluid to flow through the flow chamber to the outlet ports in the actuation body.

The configuration of the release valve and installations in which it is provided is made more compact by virtue of the arrangement of the outlet ports. In particular, it is known to provide a release valve with multiple ports at different angular locations around a housing. However, this tends to lead to a bulky or unwieldy installation as fluid connections extend from the housing in multiple different directions. In contrast, the outlet ports as shown in FIG. 1 are provided on generally the same side of the housing and define connection axes for connecting to fluid lines or other fluid connections which are generally parallel to each other. This makes for a more compact arrangement of downstream fluid lines. Further, to reduce the axial height of the housing to accommodate the plurality of outlets, they have a staggered arrangement by which they are offset from one another along both the longitudinal axis of the release valve, and also along a lateral axis which is normal to both the longitudinal axis and the connection axes of the respective ports. This permits adequate spacing for making the respective connections, while limiting the overall axial height of the release valve. In other examples, the outlet ports may only be staggered or offset along one of the longitudinal axis and the lateral axis.

The invention claimed is:

1. A release valve for releasing fluid from a source of compressed fluid for inflating an inflatable structure, comprising:
   a housing comprising an inlet for coupling to a source of compressed fluid, and an outlet;
   a flow chamber disposed within the housing and forming part of a flow path from the inlet to the outlet;
   a valve member configured to move to a release position to permit fluid to flow from the inlet to the flow chamber; and
   an actuator and a biasing device, wherein the actuator and the biasing device are disposed in the flow chamber, the actuator configured to move through the flow chamber from an unactuated position to an actuated position to move the valve member to the release position,
   wherein the biasing device comprises a spring acting on the actuator, via a projection extending from the actuator, to bias the actuator to the actuated position; and
   wherein the projection is in the form of an annular plate and comprises one or more flow holes to permit fluid to flow therethrough to the outlet in at least the actuated position of the actuator.

2. A release valve according to claim 1, wherein the biasing device is configured to drive the actuator to the actuated position.

3. A release valve according to claim 1, wherein the annular plate is secured to an external surface of the actuator.

4. A release valve according to claim 1, wherein the actuator comprises a vent to permit fluid to flow therethrough to the outlet in at least the actuated position of the actuator.

5. A release valve according to claim 1, further comprising an activation mechanism configured to be operated by a user to cause the actuator to move from the unactuated position to the actuated position.

6. A release valve according to claim 5, wherein the activation mechanism comprises a handle configured to be pulled by the user and a retaining member configured to retain the actuator in the unactuated position, wherein the retaining member is configured to move to allow the actuator to move to the actuated position when the handle is pulled by the user.

7. A release valve according to claim 6, wherein in the unactuated position, the retaining member bears against the actuator and a protrusion within the housing to retain the actuator in the unactuated position; and
   wherein when the handle is pulled by the user, the retaining member is configured to move and be retained within a groove within the actuator.

8. A release valve according to claim 1, wherein the valve member comprises a frangible disc sealingly closing the inlet to the flow chamber in the unactuated position;
   wherein the actuator further comprises a cutter configured to break the disc in the release position to allow fluid to flow from the inlet.

9. A release valve according to claim 8, wherein the cutter is integrally formed with the actuator.

10. A release valve according to claim 1, wherein the housing is formed in two parts comprising an actuation body which houses the actuator and the biasing device, and a valve body which is configured to couple to the source of compressed fluid; wherein the actuation body is releasably coupled to the valve body to define the housing therebetween.

11. A release valve according to claim 10, wherein the inlet is formed in the valve body and the outlet is formed in the actuation body.

12. A release valve according to claim 10, wherein the release valve has a longitudinal axis corresponding to a path of movement of the actuator, and wherein the outlet is formed as an outlet port extending outward from the actuation body along a direction having a radial component with respect to the longitudinal axis.

13. A release valve according to claim 12, wherein the outlet is one of two outlets, each formed as an outlet port extending outward from the actuation body along a direction having a radial component, wherein the two outlet ports each define a respective coupling axis for connecting to a respective fluid line, wherein the coupling axes are substantially parallel with one another.

14. A release valve according to claim 13, wherein the two outlet ports are offset with respect to each other such that the respective coupling axes are offset along the longitudinal axis and/or a lateral direction normal to each of the longitudinal axis and the coupling axes.

15. A storage container for a fluid under pressure, wherein the storage container comprises a release valve for releasing fluid from the storage container for inflating an inflatable structure, wherein the release valve comprises:
   a housing comprising an inlet coupled to the storage container, and an outlet;
   a flow chamber disposed within the housing and forming part of a flow path from the inlet to the outlet;
   a valve member configured to move to a release position to permit fluid to flow from the inlet to the flow chamber; and
   an actuator and a biasing device, wherein the actuator and the biasing device are disposed in the flow chamber, the actuator configured to move through the flow chamber from an unactuated position to an actuated position to move the valve member to the release position,
   wherein the biasing device comprises a spring acting on the actuator, via a projection extending from the actuator, to bias the actuator to the actuated position; and
   wherein the projection is in the form of an annular plate and comprises one or more flow holes to permit fluid to flow therethrough to the outlet in at least the actuated position of the actuator.

* * * * *